Aug. 19, 1947.    W. K. COBURN    2,426,145
CHRONOMETRIC RECORDER
Filed March 30, 1946    6 Sheets-Sheet 1

Fig. 1

INVENTOR
William K. Coburn.
BY Kenway & Witter
ATTORNEY

Aug. 19, 1947.    W. K. COBURN    2,426,145
CHRONOMETRIC RECORDER
Filed March 30, 1946    6 Sheets-Sheet 3

INVENTOR
William K. Coburn.
BY
ATTORNEY

Aug. 19, 1947.     W. K. COBURN            2,426,145
          CHRONOMETRIC RECORDER
          Filed March 30, 1946      6 Sheets-Sheet 6

INVENTOR.
William K. Coburn
BY Kenway & Witter
Attys.

Patented Aug. 19, 1947

2,426,145

UNITED STATES PATENT OFFICE 2,426,145

CHRONOMETRIC RECORDER

William Knowlton Coburn, Cambridge, Mass., assignor to Serdex, Inc., Boston, Mass., a corporation of Massachusetts Application March 30, 1946, Serial No. 658,556

11 Claims. (Cl. 234—36.5)

My invention relates to the art of meteorology and particularly to radiosonde equipment for obtaining information concerning atmospheric conditions aloft.

It has long been recognized that indications of coming weather conditions are to be found in the movement of air masses aloft, as reflected in terms of pressure, temperature, and humidity at various levels. One satisfactory method of obtaining such data has been to release a balloon carrying a small radio transmitter automatically keyed by elements responsive to changes in temperature, pressure, and humidity and operating in turn to send series of signals to a receiver on the ground. At the ground station the signals are impressed on a recording instrument which marks a sheet of moving paper at intervals appropriate to form a code or system of marks against scales graduated in terms of the data required.

The transmitter is keyed by styli connected to the weather responsive elements and playing over a drum presenting a helix of wire on its periphery and driven by a constant speed motor. The recorder at the ground station includes a similar drum and helix and a tapper bar arranged to press together, and against the helix, superposed sheets of carbon paper and scaled or graph paper. The tapper bar is actuated by the signals received from the balloon transmitter.

The accuracy of a radiosonde system including a chronometric recorder of the type described depends to a great extent upon the maintenance of precise synchronization between the balloon helix drum and the recorder helix drum. It is, of course, impossible to control the speed of the motor driving the drum in a released balloon. Therefore it is the recorder drive which must be capable of adjustment. By providing the balloon helix drum with means for sending a reference signal through the transmitter at a predetermined point in the revolution of the helix, preferably at the beginning of each cycle, we are able to obtain accurate information as to changes in the rate of transmitter helix. The problem then becomes one of devising a variable speed drive for the recorder helix and of coupling with it a sufficiently accurate speed controlling system. If these obstacles are successfully overcome, accurate synchronization of the helices is rendered possible.

The entire cycle includes, in addition to the reference signal, signals responsive to the elements sensitive to pressure temperature and humidity. The sequence in which the signals are received is predetermined. It will be appreciated that if the recorder cycle were to be started by a signal other than the reference signal, the record would be unintelligible. If, for example, a pressure signal acted as a reference signal, the cycle as printed would not be the cycle as transmitted from the balloon. Furthermore it is only the reference signals which are spaced at uniform intervals; the information signals have no predetermined interval and could not be used as the basis for synchronizing the recorder.

The most important object of my invention is to improve the efficiency of radiosonde meteorology and make it possible to obtain accurate and immediate reports relating to conditions aloft.

Another object of my invention is to improve the recording of weather data received from radiosonde transmitters.

Still another object of the invention is to provide a method for accurately synchronizing a recorder drive with the drive of any kind of apparatus in communication electrically with the recorder.

One feature of the invention resides in a novel method for synchronizing a radiosonde transmitter helix with a recorder helix, including the steps of operating the recorder helix at a slightly greater rate than the transmitter helix, stopping the recorder helix after one revolution, then inserting in the drive for the recorder helix a correction corresponding to its loss or gain in rate with respect to the transmitter helix during the cycle, and starting the recorder helix again simultaneously with the initiation of another revolution of the transmitter helix.

Another feature of the invention resides in apparatus for automatically carrying out the method outlined in the preceding paragraph.

These and other objects and features of the invention and the advantages incident thereto will be more readily understood and appreciated from the following detailed description of preferred embodiments thereof selected for purposes of illustration and shown in the accompanying drawings, in which:

Before proceeding to a description of the recorder I shall discuss briefly the nature of the unit carried by the balloon. I have not shown such a unit in the drawings because my invention may be applied to any of the commonly used types of balloon transmitter units. Such a unit includes a frame mounting a clockwork mechanism or motor driving a cylindrical drum which is wound on the surface with a single helix of wire. In the language of the art the drum and the wire are known collectively as "the helix."

Poised in contact with the periphery of the drum at intervals are three metal styli worked to slide axially along the drum by means of linkages operated respectively by elements responsive to temperature, pressure, and humidity. The frame carries a small transmitter powered by batteries and so connected to the helix and the styli that the continuous wave emitted by the transmitter is momentarily interrupted whenever one of the styli touches the wire of the helix. Furthermore a contact member touches the wire at the zero point in the rotation of the drum to cause the transmitter to send out a reference or synchronizing signal employed at the ground station for tying in a recorder, as will presently appear. The styli are so arranged that they touch the wire in predetermined order once during each cycle. Consequently, there are four signals broadcast per cycle, i. e.. a reference signal first, and then signals representing temperature, pressure, and humidity.

Coming now to the ground station and to the apparatus comprising my invention, I provide a conventional radio receiver tuned to the frequency of the balloon transmitter and connected to a recorder. The mechanical aspect of the recorder is represented particularly in Figs. 1 and 2 wherein I have shown a metal base 10 provided with parallel side walls 12 and an end wall 14.

Figure 1:
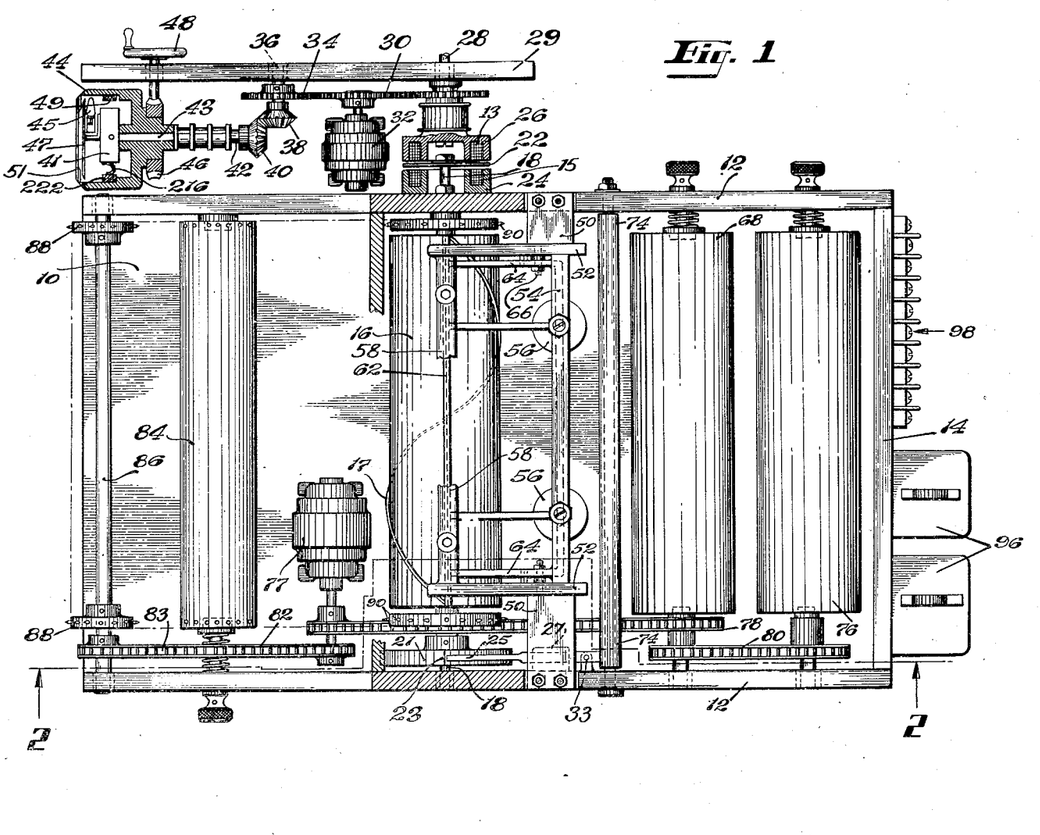
Fig. 1 is a plan view of a recorder constructed according to the invention.
Figure 2:
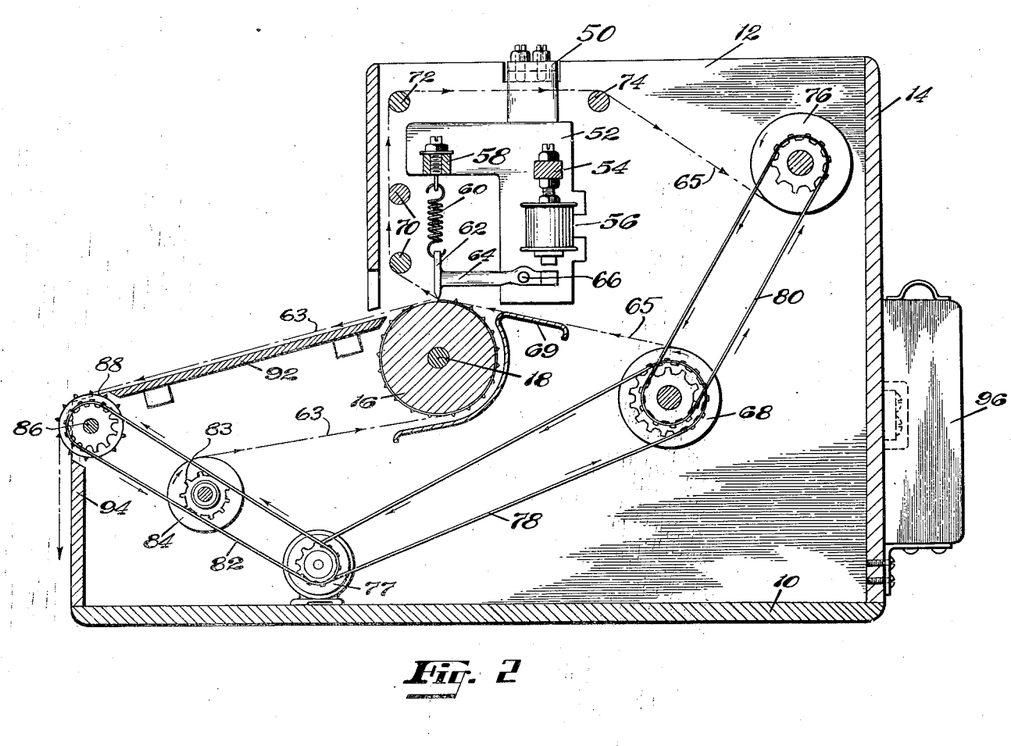
Fig. 2 is a view in cross-section along the line 2—2 of Fig. 1.

A drum 16 of Bakelite, or other suitable material is provided on its periphery with a helix 17 of heavy gauge wire fitted in a groove and so wound as to make one complete 360° spiral on the drum. A shaft 18 journalled in the walls 12 is keyed to the drum 16 and carries at one end a flexible diaphragm 22 of ferrous metal disposed between a pair of spaced housings 24 and 26 within which are wound coils of wire 13 and 15. The inner housing 24 is fastened to the wall 12, while the outer housing 26 is secured to the end of a shaft 28 journalled in a metal wall or housing 29 and driven through a set of reduction gears 30 from a motor 32.

The housings 24 and 26 with their coils act as a magnetic clutch and brake assembly. When the coil in the housing 24 is energized, the diaphragm 22 is pulled against the housing 24 and the drum is braked. Conversely when the coil in the housing 26 is energized, the diaphragm is pulled against the housing 26 and causes the drum to turn with the shaft 28.

Figure 3:
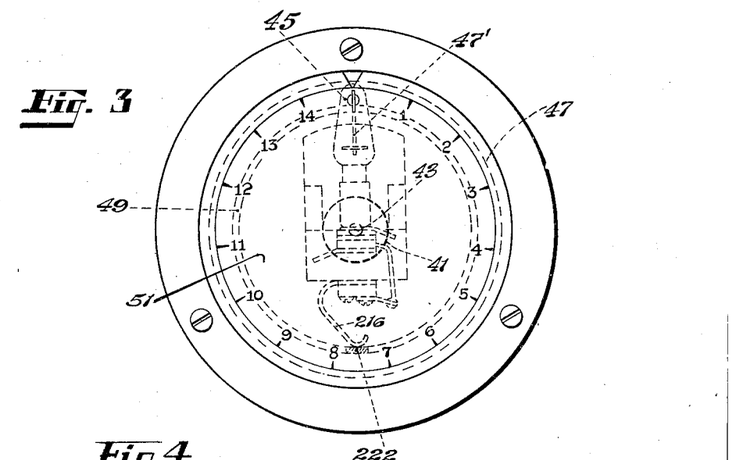
Fig. 3 is a view in front elevation of the synchronizer dial with pointers removed.

The motor 32 also drives a set of reduction gears 34 which drive a shaft 36 journalled in the wall 29 and provided with a bevel gear 38 in mesh with a second bevel gear 40 carried on a shaft 42 having a reduced end 43 extending through a cylindrical housing 44. The housing 44 is fast to a worm wheel 46 driven by a worm (not shown) controlled by a hand wheel 48. On the end of the shaft 43 is secured a block 41 on which is mounted a neon bulb 45. Also secured to the block is an opaque dial or bezel 47 provided opposite the neon bulb 45 with a radial slit 47'. The block 41 also carries a wiper contact or pointer 216 which bears against an annulus 49 of Bakelite or other insulating material interrupted at one place by a short metal slug or segment 222. The housing carries a glass dial or bezel 51 provided around its periphery with numerals from 1 to 15, at equally spaced intervals.

When the motor 32 turns the shaft 42, the rotation of the shaft portion 43 rotates the block 41 and the elements secured thereon. Thus the pointer 216 wipes around the surface of the Bakelite annulus 49 which is secured to the housing 44 and does not move. However, the hand wheel 48 may be manipulated to turn the housing 44 with respect to the block 41. The operation of this portion of the mechanism can best be appreciated and understood in connection with the discussion of the circuit diagram which follows later.

Figure 4:
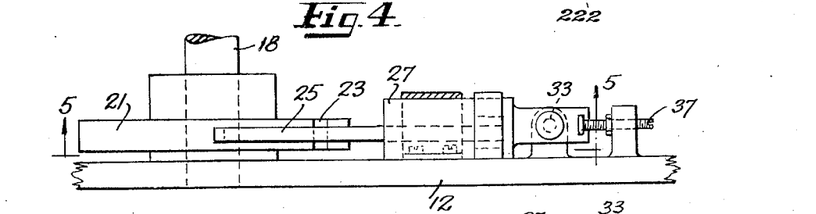
Fig. 4 is a plan view showing the adjusting means for the helix stop cam switch.
Figure 5:
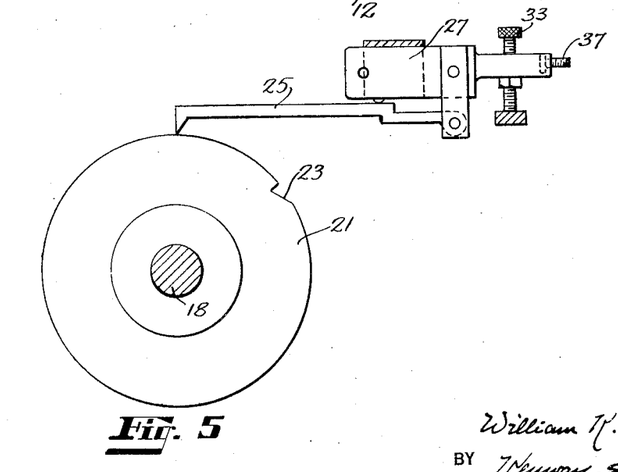
Fig. 5 is a view, partly diagrammatic, in side elevation of the helix stop cam and switch.

Secured to the helix drive shaft 18 adjacent one end thereof is a disk cam member 21 provided in its periphery with a shallow depression or notch 23 and cooperating with a switch control member 25 mounted in a block 27 adjustably secured to the side wall 12. As shown in Fig. 4 the block 27 may be adjusted along a horizontal path by means of a set screw 37 working in a lug secured to the wall 12. The block 27 is also controlled by a set screw 33 which may be adjusted to vary the vertical position of the assembly with respect to the cam wheel 21. The function of the cam wheel 21 is to operate the switch 25 to stop the rotation of the helix through means best understood in connection with the description of the circuit diagram in Fig. 7.

Adjustably mounted in the side walls 12 is a pair of oppositely disposed tapper bar assembly supports 50, each of which carries a metal end wall 52 between which extends a rear support rod 54 from which a pair of solenoids 56 is suspended. The end walls 52 also provide mounting for a front support member 58 extending parallel to the rear support 54 and from which is suspended a pair of springs 60 carrying a knife edged tapper bar 62. At the ends of the tapper bar 62 is secured a pair of levers 64, which work on pivot points 66 set in the walls 52, and are bent to extend beneath the solenoids 56.

Rotatably mounted between the walls 12 behind and below the tapper bar assembly is a reel 68 for carbon paper 65 which advances from the reel over a guide 69, between the drum 16 and the tapper bar 62, upwardly across the vertically aligned guide rollers 70, and rearwardly across another pair of rollers 72 and 74 to a collecting reel 76 also rotatably mounted between the side walls 12. A motor 77 secured to the base 10 is provided with a sprocket carrying a chain 78 which drives the reel 68. A similar chain 80 runs on sprockets on the reels 68 and 76 to provide a synchronous drive for both reels.

Below and in front of the drum is mounted a reel 84 for plain or scaled record-receiving paper 63 which advances from the reel to the drum 16 adjacent the guide 69 where it is led beneath the carbon paper 65 leaving the reel 68. The two papers move together beneath the tapper bar, but the scaled paper then moves over a table 92 and over a pair of toothed wheels 88 keyed to a transverse shaft 86 driven by a chain 82 which also drives the reel 84. A pair of toothed idlers 90 are mounted on the shaft 18 for assisting the feeding of the papers. The teeth engage perforations in the margins of the paper and serve to prevent the paper from sliding from side to side.

The switches for the motors 32 and 77 are contained in housings 96 secured to the rear wall 14. A terminal block 98 is also mounted on this rear wall.

Figure 6:
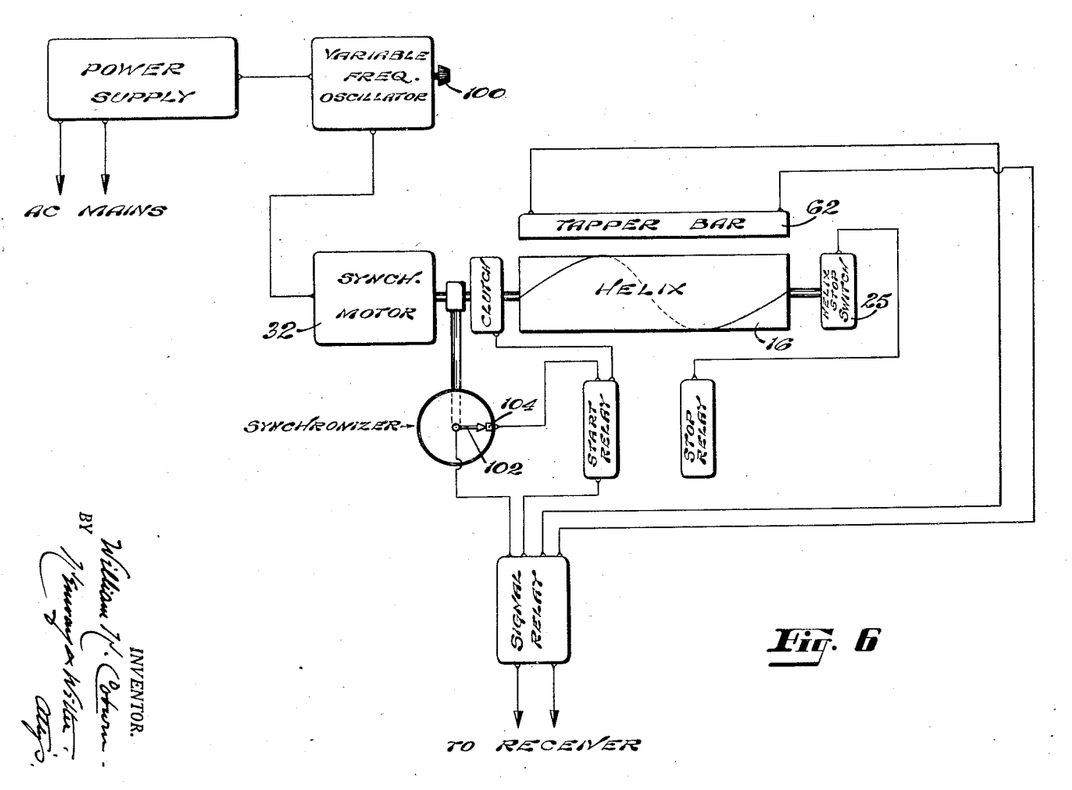
Fig. 6 is a block diagram of the elements of the recorder.

One circuit for driving the recorder elements is illustrated in the block diagram, Fig. 6, wherein it will be seen that a variable frequency oscillator (of conventional design), coupled to a power supply unit, serves to drive the motor 32, the speed of which is to be synchronized with the transmitter helix in the balloon. By varying the oscillator frequency the operator may vary the speed of the motor 32, and a knob 100 is shown for the purpose of indicating the manner in which the oscillator frequency may be varied.

The receiver (not shown) is connected to a signal relay which in turn is connected to the tapper bar circuit and to the synchronizer. The latter is represented by the pointer 102 arranged to be rotated by shafts and gearing from the motor 32. A segment 104 disposed in the dial in position to be swept by the pointer is connected to a "start relay" arranged to actuate the magnetic clutch when the reference signal comes from the receiver and provided the pointer 102 is in contact with the segment 104. When the helix 16 has completed one revolution, the stop cam 21 opens the switch 25 to actuate a "stop relay" which de-energizes the magnetic clutch and energizes the magnetic brake.

The gearing is such that it requires fifteen seconds for the pointer to complete a revolution, but the helix is arranged to complete its revolution in fourteen seconds. Consequently, there is a rest period during which the operator may manipulate the knob 100 to change the speed of the motor to bring the pointer into synchronization with the reference signals received from the transmitter helix.

Figure 7:
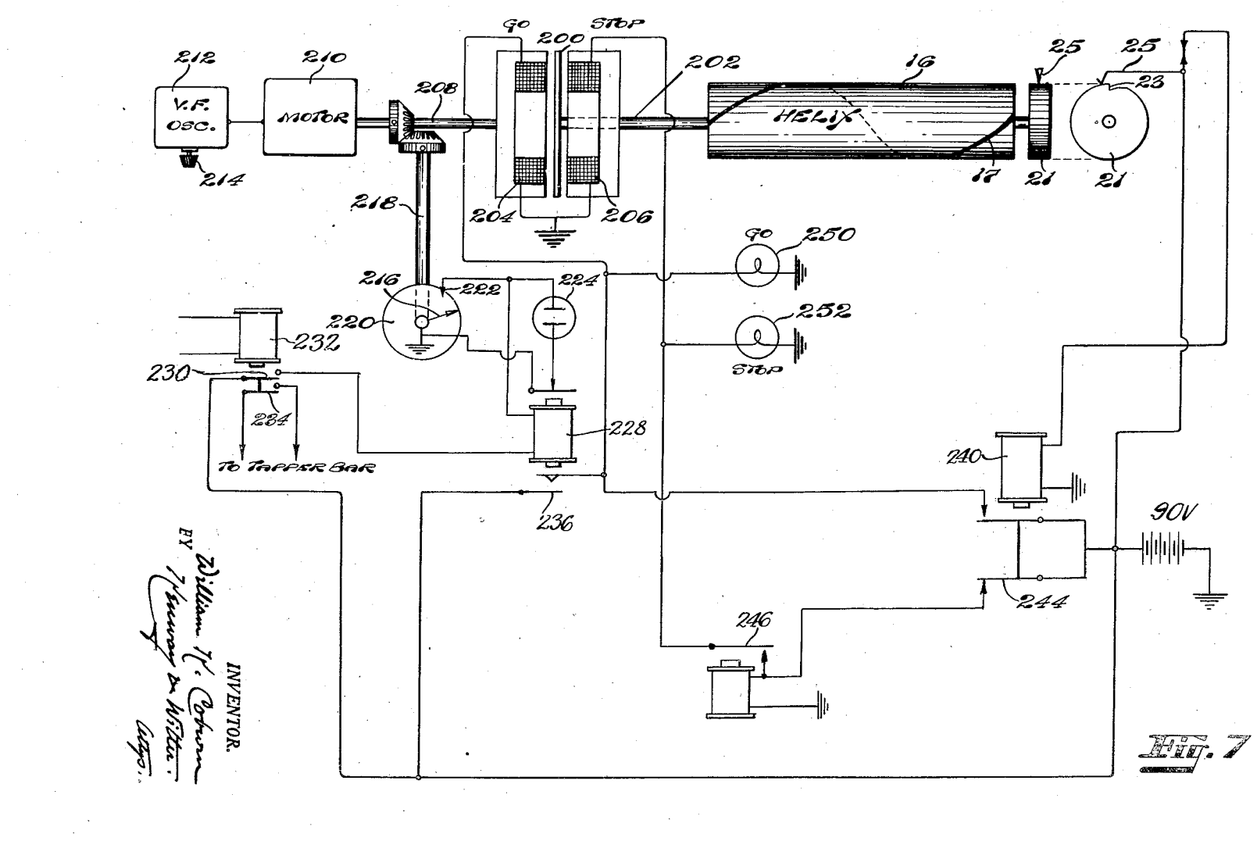
Fig. 7 is a circuit diagram for a manually controlled synchronized recorder.

With this general explanation in mind the reader can better appreciate the operation of the circuit shown in Fig. 7. Here again the helix 16 is driven through a magnetic clutch and brake comprising a diaphragm 200 carried on the end of the helix shaft 202 and disposed between a clutch coil 204 and a brake coil 206. One side of each coil is grounded. A shaft 208, which drives the clutch housing, is driven from a motor 210 (corresponding in function to that of the motor 32 in Fig. 6) which in turn is driven from a variable frequency oscillator 212. A control knob 214 is provided for manually varying the oscillator output frequency. A pointer 216 is driven from the motor 210 through a shaft 218 and sweeps a dial 220 having a contact segment 222. A neon bulb 224 is connected across the pointer and the segment, the circuit including a switch 226 controlled by a latching relay 228 one side of which is adapted to be grounded through the segment 222 and the pointer 216. The other side of the latching relay 228 is connected to a switch 230 controlled by a relay 232 which forms the load for the ground radio receiver (not shown). A second switch 234 is coupled to the relay 232 and actuates the tapper bar circuit.

When a signal is applied from the receiver to the relay 232 the tapper bar is actuated through the switch 234. If the pointer 216 is then in contact with the segment 222, the neon bulb 224 flashes. However, the relay 228 is also energized to open the switch 226 and extinguish the bulb at once. The relay 228 is of the type which is latched when an impulse reaches it, with the result that the bulb 224 cannot flash again until the relay releases the switch 226 and another impulse operates the relay 232.

When the switch 230 is closed by the relay 232, a circuit is formed starting from the positive terminal of the 90 volt battery shown at the extreme right of the wiring diagram of Fig. 7, proceeding through the switch contacts 230, through the solenoid coil for the relay 228, then to the segment 222, through the pointer 216, to ground. In this circuit the coil of the relay 228 serves as the load.

When the relay 228 is energized it pulls closed a switch 236 which closes a circuit through the magnetic clutch and including a source of 90 volt current. The helix then begins to revolve, the switch member 25 rides out of the notch on the stop cam 21 and a circuit is closed including a relay 240 which controls a switch 242 connected across the 90 volt source and the magnetic clutch coil 204.

When the helix completes one revolution the switch 25 opens as the member falls into the notch 23. The relay 240 is actuated to open the switch 242, and close a switch 244. The latter switch controls an unlatching relay 245 which in turn operates a switch 246 controlling the circuit to the magnetic brake coil 206. The relay 245 is ganged with the relay 228 so that energization of the relay 245 not only actuates the magnetic brake but also unlatches the relay 228 causing the switch 236 to open the circuit to the magnetic clutch.

In order to provide a check on the operation of the circuits above discussed, I connect a lamp 250 across the clutch control circuit to ground, preferably a green lamp; similarly a red lamp 252 may be connected across the brake control circuit to ground. Consequently, the operator of the equipment is enabled to determine visually which circuit is energized.

If a signal operates the relay 232 when the pointer 216 is not in contact with the segment 222 the neon bulb 224 will flash and the tapper bar will be actuated. However, the relay 228 will not be actuated, and the brake will remain on. The resistance across the neon bulb is great enough to prevent actuation of the relay 228, although the bulb will flash. The red light 252 will remain on, and the light 250 will remain extinguished. By observing the relation of the pointer 216 to the segment 222 through the slit 47 (Fig. 3) the operator can determine whether to speed up the motor 210 or slow it down. He then manipulates the control knob 214 to vary the oscillator output frequency until the speed of the pointer matches the speed of the transmitter helix. The first step, of course, is to manipulate the hand wheel 48 to get a reference signal to coincide with the juxtaposition of the pointer and the segment.

The gearing is such that the helix rotates faster than the pointer 216, while the latter is set to run at the same speed as the transmitter helix. For example, the latter two may be set to turn at 4 R. P. M. and the recorder helix at 4.2 R. P. M. Consequently, the helix 16 will stop when the pointer 216 and transmitter helix have completed approximately 90% of a revolution. The waiting period may be used to apply the proper speed correction to the oscillator so that the ensuing cycle of the pointer will exactly match that of the transmitter helix.

The speed of the transmitter helix changes unavoidably as the balloon increases altitude. However, the change is generally very gradual, and an operator bay be trained in a short time to assess the changes and operate the frequency control knob in proper fashion.

The foregoing discussion has related to reference signals. It will be obvious that the apparatus is set up so that the reference signal will operate the various relays in the manner described, based on the conjunction of the pointer and segment. The information signals come in when the ponter and segment are not in contact and the only effect is to actuate the tapper bar. If no reference signal is received, the helix will not revolve, and the actuation of the tapper bar does no harm.

The recorder described above requires a trained operator to run it properly. However, I have also invented an automatically synchronized recorder which requires only to be set in operation properly and will thereafter continue by itself without attention.

Figure 8:
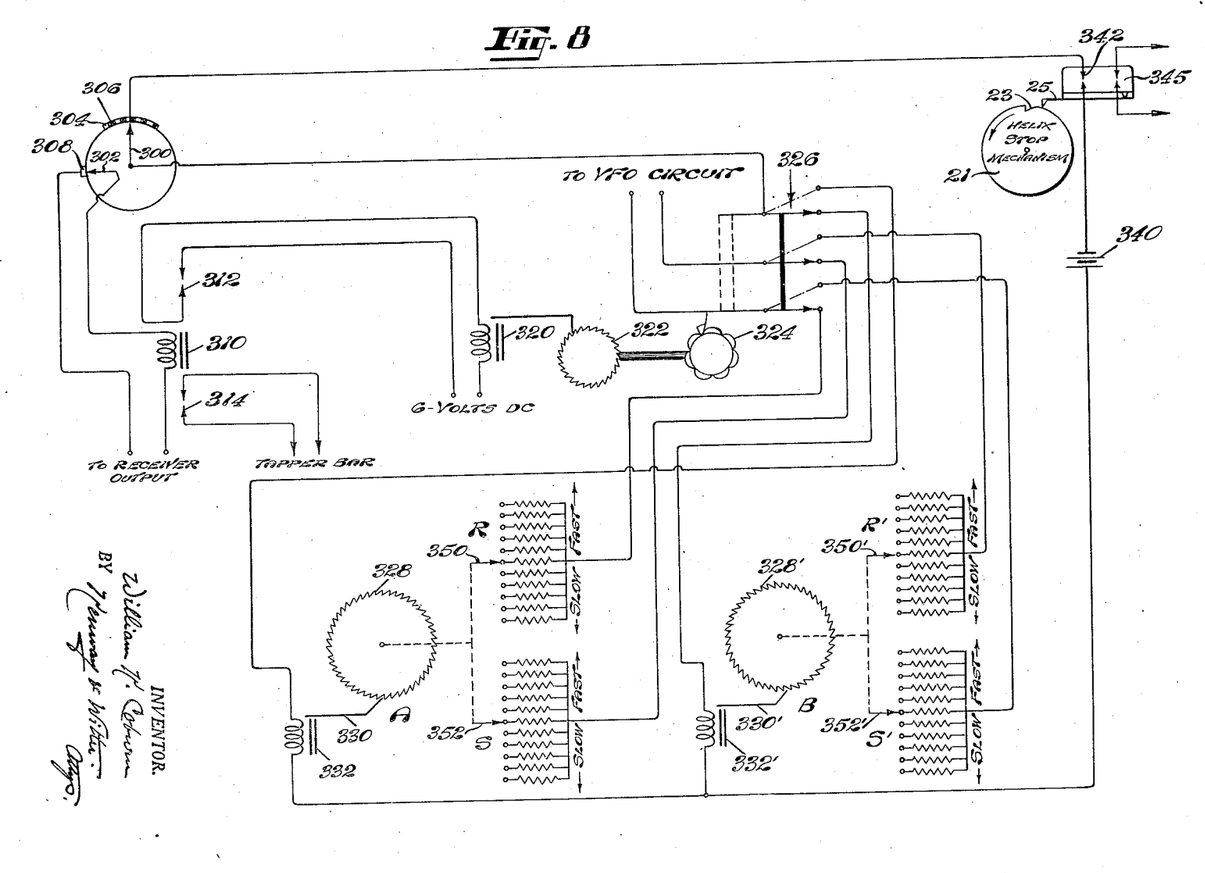
Fig. 8 is a circuit diagram for an automatic synchronizer for the recorder.

The circuit for the automatically synchronized recorder is shown in Fig. 8. As before, I utilize a helix driven by a motor similar to the motor 210 controlled by a variable frequency oscillator similar to the oscillator 212. The elements which are not shown in Fig. 8 correspond to those shown in the other figures. In this case I provide a dial having two pointers 300 and 302 insulated from each other and angularly offset. The pointer 300 wipes across a series of commutator segments 304 separated by blocks 306 of insulating material. The pointer 302 wipes across a segment 308 dimensioned to cover 12° of the pointer rotation. The output of the receiver (not shown) is connected across the pointer 302 and the segment 308 and includes a relay 310 controlling a switch 314 and a switch 312. Unless the pointer 302 is touching the segment 308 when a signal comes through, the relay 310 will not be actuated.

The switch 314 controls the tapper bar circuit, while the switch 312 controls a relay 320 arranged to operate a stepping switch 322 provided with a cam wheel 324 actuating a nine-pole gang switch 326. The gang switch 326 is always connected to the variable frequency oscillator and is alternately connected to one of a pair of stepping relays A and B. Each of the relays A and B includes a switch member comprising a toothed wheel 328 (328') (hereinafter sometimes referred to as the switch itself) actuated by a dog 330 (330') operated by a solenoid 332 (332'). The solenoids 332 and 332' are connected alternately through the gang switch 326 to the pointer 300, and the commutator segments 304 are connected to a battery 340 through a switch 342 controlled by the helix stop cam 21. The battery 340 is also connected to one side of the relays 332 and 332'. The helix stop cam 21 also controls a switch 345 which actuates the clutch and brake in the manner shown in Fig. 7.

Assuming that the switch 326 is in position to put the relay A in the circuit, the pointer 300 will transmit a pulse to the solenoid 332 each time it wipes across one of the commutator segments 304. Consequently, the dog 330 will operate to step the wheel 328 by one tooth every time the relay pulses. The relay A controls two banks of resistors R and S through a pair of rotating contact members 350 and 352. Each bank of resistors R and S may be connected through the switch 326 to the variable frequency oscillator, and the arrangement is such that when the solenoid 332 is connected to the pointer 300, the banks of resistors R' and S' of the relay B are connected to the oscillator, and the contacts 350' and 352' are at rest to connect into the oscillator circuit a given pair of resistors, one from each of the banks R' and S'. The resistors are included in the oscillator circuit with the other elements thereof, and their value determines the frequency of the oscillator output. Obviously the resistors could be replaced by inductors or capacitors of suitable values in order to effect a similar result.

When the helix completes a revolution, the switch member 25 falls into the notch 23 opening the switch 342, thus preventing the pointer 300 from sending impulses to the relays A or B. The member 25 also operates to de-energize the magnetic clutch and energize the brake, as discussed in conjunction with Fig. 7; the clutch and brake coils and relays do not appear in Fig. 8.

The pointers 300 and 302 have not finished a revolution when the helix is stopped but continue until they arrive at the zero position once more. The segment 308 covers approximately six degrees either side of the zero point. Consequently, the following reference signal will actuate the circuit even though it be a trifle off the zero point.

Synchronization is obtained in the following manner. Assume that relay A is in control of the oscillator, i. e., the solenoid 332 is disconnected but the resistor banks R and S are connected to the oscillator through the switch 326. One resistor in each bank is thus included in the oscillator circuit and the pair determines the speed of the motor. The banks R' and S' are disconnected but the solenoid 332' is energized by pulses transmitted from the pointer 300. The resistors, the wheels 328 and 328' and the contacts 350, 350', 352, and 352' are so operated that if the pointer 300 is exactly synchronized with the transmitter helix, the resistor terminals touched by the contacts 350' and 352' at the instant the cycle ends will be the same in value as the resistors in the banks R and S which governed the speed of that cycle of the pointer and helix. While I have shown a circuit in which resistors are used as the elements by means of which the frequency of the oscillator is changed, I may employ any suitable type of impedance for the same function. For example the banks of resistors might be replaced by banks of condensers or inductances. If the pointer 300 is slower than the transmitter helix, the pointer will have travelled less than 360° when the next reference signal comes in. (The helix, of course, stops when the pointer reaches about 324° of its revolution.) The reference signal will therefore operate the solenoid 332 to disconnect banks R and S and the solenoid 332' and connect in the banks R' and S' before the solenoid 332' has come to the point of causing the contacts 350' and 352' to touch the terminals of resistors having the same value as those in the banks R and S which governed the speed of the first cycle. The different resistors now connected in from the banks R' and S' will be just enough different in value to increase the oscillator frequency sufficiently to match the speed of the pointer 300 to that of the transmitter helix. To recapitulate somewhat, the circuit is so arranged that the frequency of the output of the variable frequency oscillator is a function of the values of two resistors. By providing a pair of banks of resistors of differing values, I am able to determine the frequency of the oscillator by selecting one resistor from each bank and connecting it appropriately into the circuit of the oscillator. The switching in of the pair of resistors in the case of the banks R and S is controlled by the stepping switch 328. The resistors in the banks R' and S' are counterparts of those in the banks R and S and the switch 328' is the counterpart of the switch 328. The gang switch 326 is arranged to give control of the oscillator alternately to the R and S bank and to the R' and S' bank. As explained above, while a pair of resistors from the banks R and S are functioning in the oscillator circuit, the step switch 328 is being operated to select from the R' and S' bank the proper pair of resistors to govern the oscillator during the next cycle of the equipment. In other words, each assembly is either governing the oscillator or being placed in a condition to govern the oscillator during the next cycle.

Similarly if the pointer 300 travels faster than the transmitter helix, it will have travelled more than 360° when the second reference signal comes in. The wheel 328 or 328', depending on the position of the switch 326, will connect in the proper values of resistors from one set of banks to slow down the motor by lowering the oscillator output frequency. I have found that by including about twenty commutator segments in the path of the pointer 300 I can detect and correct for differences in speed as small as 0.2%. The twelve degree segment 308 is long enough to accommodate such changes of speed as are ordinarily encountered in radiosonde practice.

If because of interference or other cause no reference signal is received, no harm is done. I have found in practice that I may skip several reference signals without throwing the synchronizing circuit out of operation. As explained above, the increments of speed change from cycle to cycle are so small that my system can easily accommodate the changes accumulated in several missed cycles.

The relays A and B are self-cycling, a feature which becomes of importance only when for some reason the reference signal is not received. When this happens the switch 326 will not operate to change the connections to the relays A and B, but the self-cycling feature comes into play with the result that one of the wheels 328 and 328' which was doing the moving during the preceding cycle will fly back to the position it had at the start of its preceding cycle, thus connecting the contacts 350 (350'), and 352 (352') to the set of resistors equalling the value of those controlling the oscillator during the penultimate cycle. The circuit will then be ready to operate upon the receipt of the next reference signal.

It should be pointed out that the automatic synchronizing circuit shown in Fig. 8, or the manual control circuit shown in Fig. 7, may be used to synchronize instrumentalities other than a recorder for radiosonde. For example, either circuit may be used to synchronize the instrumentalities of a facsimile transmitting and receiving system. Those skilled in the art will appreciate many modifications and applications of the invention shown in the embodiments selected for detailed description herein.

Having now described and illustrated preferred embodiments of my invention, what I claim as new and desire to secure by Letters Patent of the United States is:

1. Apparatus of the class described, which comprises a drum, a rotatable pointer, means for driving said drum and said pointer and for driving the drum faster than said pointer, means for stopping said drum after one revolution and before said pointer stops, means responsive to a received signal for starting said drum, and means associated with said pointer for automatically varying the speed of said driving means in accordance with the variation in the intervals between received signals.

2. Apparatus of the class described, which comprises a drum, a motor arranged to rotate said drum, a variable frequency oscillator controlling the speed of said motor, a rotatable contact member driven by said motor, and means responsive to a series of received reference signals for starting said drum only when said contact member is in a predetermined position.

3. Apparatus of the class described, which comprises a drum, a motor arranged to rotate said drum, means for varying the speed of said motor, a rotating contact member driven by said motor more slowly than said drum, means responsive to a reference signal for starting said drum only when said contact member is in a predetermined position, and means for stopping said drum before said member completes a revolution.

4. Apparatus of the class described, which comprises a radiosonde recorder helix, driving means for turning said helix, a movable contact member driven from said driving means, means connected to said member for starting said helix in response to a signal received only when said member is in predetermined position, and means for stopping the helix before the member completes a cycle of movement.

5. Apparatus of the class described, which comprises a radiosonde recorder helix, a motor, a magnetic clutch driven by said motor and arranged to turn said helix when energized, a magnetic brake arranged to stop the helix when energized, a cam operated switch connected to actuate said brake once during every revolution of the helix, and means responsive to a series of received signals for energizing said clutch and simultaneously releasing said brake.

6. Apparatus of the class described, which comprises a radiosonde recorder helix, a motor, a magnetic clutch driven by said motor and arranged to turn said helix when energized, a magnetic brake arranged to stop the helix when energized, a cam operated switch connected to actuate said brake once during every revolution of the helix, a movable contact driven by said motor more slowly than said helix, means including a relay for starting said drum each time a reference signal is applied across said relay, and means for energizing said relay only when the cycle of movement of said contact is in predetermined time relation to the interval between reference signals.

7. Apparatus of the class described, comprising a variable frequency oscillator, a motor driven by said oscillator and responsive in speed to the oscillator output frequency, recording means driven by said motor, a pair of rotatable contact members driven by said motor more slowly than said recording means, a circuit associated with one of said contact members for starting said recording means only when said member is in predetermined position and a reference signal is applied thereto, means for automatically stopping said recording means at the completion of its cycle, and means associated with the other contact member for varying the oscillator output frequency as the interval between reference signals varies.

8. Apparatus of the class described, including means responsive to a series of received reference signals, which comprises a helix, a motor driving said helix, a variable frequency oscillator driving said motor and controlling by its output frequency the speed of said motor, a first and a second rotatable contact member driven by said motor more slowly than said helix, a pair of stepping switches, a plurality of impedances connected to each of said stepping switches, and selectively included in the circuit of said oscillator to determine the frequency thereof, a control switch arranged to connect to the oscillator an impedance controlled by one of said stepping switches and open the circuit to the stepping switch associated with the impedance so connected, said control switch also being arranged to close the circuit to the other stepping switch and simultaneously disconnect from the oscillator all the impedances controlled by the stepping switch so connected, means for reversing the connections to said control switch upon the receipt of a reference signal, means connected to the first contact member for starting the helix upon the receipt of a reference signal only when said first member is in predetermined position, and means associated with the second contact member for sending energizing pulses to that one of the stepping switches closed by said control switch.

9. Apparatus of the class described, including means responsive to a series of received reference signals, which comprises a helix, a motor driving said helix, a variable frequency oscillator driving said motor and controlling by its output frequency the speed of said motor, a first and a second rotatable contact member driven by said motor more slowly than said helix, a pair of stepping switches, a plurality of impedances connected to each of said stepping switches, and selectively included in the circuit of said oscillator to determine the frequency thereof, a control switch arranged to connect to the oscillator an impedance controlled by one of said stepping switches and open the circuit to the stepping switch associated with impedance so connected, said control switch also being arranged to close the circuit to the other stepping switch and simultaneously disconnect from the oscillator all the impedances controlled by the stepping switch so connected, means for reversing the connections to said control switch upon the receipt of a reference signal, means connected to the first contact member for starting the helix upon the receipt of a reference signal only when said first member is in predetermined position, means associated with the second contact member for sending energizing pulses to that one of the stepping switches closed by said control switch, and means for stopping the helix before the contact members complete a revolution.

10. Chronometric radiosonde recorder which comprises a marking mechanism, an electro-mechanical train connected to actuate said marking mechanism and including an energizing circuit operable automatically upon receipt of a radio signal, a motor included in said train, an oscillator connected to control the speed of the motor, and a circuit containing elements responsive to a series of received radio reference signals and connected to said oscillator for varying the frequency thereof in accordance with variations in elapsed times between successive received radio signals.

11. Chronometric radiosonde recorder comprising a marking mechanism, an electro-mechanical train connected to actuate said mechanism and including a rotatable contact member, a stationary contact member, a motor for driving said pointer, said train being responsive to received radio reference signals reaching the train only when the contact members are touched, and a speed control circuit connected to said motor and responsive in its operation to the time elapsing between the receipt of successive radio reference signals.

WILLIAM KNOWLTON COBURN.

REFERENCES CITED

The following references are of record in the file of this patent:

UNITED STATES PATENTS

| Number | Name | Date |
|---|---|---|
| 1,747,839 | Ogle | Feb. 18, 1930 |
| 2,350,008 | Artzt | May 30, 1944 |
| 2,289,080 | Smith | July 7, 1942 |
| 2,304,702 | Myers | Dec. 8, 1942 |
| 2,313,466 | Dicke | Mar. 9, 1943 |
| 2,250,509 | Turner | July 29, 1941 |
| 2,340,279 | Wallace | Jan. 25, 1944 |
| 2,354,086 | MacKay | July 18, 1944 |
| 2,374,653 | Colt et al. | May 1, 1945 |